United States Patent
Otake et al.

(10) Patent No.: US 10,689,493 B2
(45) Date of Patent: Jun. 23, 2020

(54) THERMOSETTING RESIN COMPOSITION

(71) Applicant: SHOWA DENKO K.K., Tokyo (JP)

(72) Inventors: Hiromi Otake, Tokyo (JP); Aoi Nakano, Tokyo (JP); Chika Yamashita, Tokyo (JP); Yoshitaka Ishibashi, Tokyo (JP); Hiroshi Uchida, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 184 days.

(21) Appl. No.: 15/531,587

(22) PCT Filed: Dec. 11, 2015

(86) PCT No.: PCT/JP2015/084838
§ 371 (c)(1),
(2) Date: May 30, 2017

(87) PCT Pub. No.: WO2016/104196
PCT Pub. Date: Jun. 30, 2016

(65) Prior Publication Data
US 2018/0282494 A1    Oct. 4, 2018

(30) Foreign Application Priority Data

Dec. 25, 2014  (JP) .................... 2014-263515

(51) Int. Cl.
| | | |
|---|---|---|
| *C08J 3/24* | (2006.01) | |
| *C08K 3/36* | (2006.01) | |
| *C08F 290/14* | (2006.01) | |
| *C08L 61/14* | (2006.01) | |
| *C08G 8/10* | (2006.01) | |
| *C08G 8/30* | (2006.01) | |
| *C08K 3/013* | (2018.01) | |
| *C08G 8/32* | (2006.01) | |
| *C08K 5/14* | (2006.01) | |

(52) U.S. Cl.
CPC .............. *C08J 3/24* (2013.01); *C08F 290/14* (2013.01); *C08G 8/10* (2013.01); *C08G 8/30* (2013.01); *C08G 8/32* (2013.01); *C08K 3/36* (2013.01); *C08L 61/14* (2013.01); *C08J 2361/14* (2013.01); *C08K 3/013* (2018.01); *C08K 5/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,173,592 A | * | 11/1979 | Suzuki ................ | C08F 222/40 524/509 |
| 4,632,966 A | * | 12/1986 | Kanagawa ........... | C08F 290/14 525/502 |
| 5,041,507 A | * | 8/1991 | Kanagawa ............ | C08G 59/02 525/486 |
| 5,087,766 A | * | 2/1992 | Kanayama ........... | C07C 37/055 568/718 |
| 5,290,882 A | | 3/1994 | Shiobara et al. | |
| 5,367,043 A | * | 11/1994 | Butler ................... | C08G 61/00 528/193 |
| 5,618,984 A | * | 4/1997 | Kawabata ............. | C08G 61/02 523/400 |
| 5,624,989 A | * | 4/1997 | Yamaguchi ........... | H01L 23/295 257/792 |
| 2002/0077423 A1 | * | 6/2002 | Sugimoto ............. | C08K 5/3415 525/178 |
| 2013/0026660 A1 | * | 1/2013 | Czubarow ............. | H01L 23/293 257/788 |

FOREIGN PATENT DOCUMENTS

| | | | | |
|---|---|---|---|---|
| EP | 0352868 A1 | * | 1/1990 | ............ C08F 222/40 |
| JP | 62-022812 A | | 1/1987 | |
| JP | 62-268132 A | | 11/1987 | |
| JP | 62-280254 A | | 12/1987 | |
| JP | 05-006869 A | | 1/1993 | |
| JP | 05-043630 A | | 2/1993 | |
| JP | 06-093047 A | | 4/1994 | |
| JP | 07-316395 A | | 12/1995 | |
| JP | 2013-199627 A | | 10/2013 | |
| JP | 2013-231102 A | | 11/2013 | |
| JP | 2013-256586 A | | 12/2013 | |

OTHER PUBLICATIONS

U.S. Appl. No. 15/533,549, filed Jun. 6, 2017, Inventors: Hiromi Otake, Aoi Nakano, Chika Yamashita, Yoshitaka Ishibashi, and Hiroshi Uchida.
International Search Report for PCT/JP2015/084838 dated Mar. 1, 2016.
Communication dated Sep. 30, 2018 from the State Intellectual Property Office of the P.R.C. in counterpart Application No. 201580062305.8.

* cited by examiner

*Primary Examiner* — Nicole M. Buie-Hatcher
(74) *Attorney, Agent, or Firm* — Sughrue Mion, PLLC

(57) ABSTRACT

A thermosetting resin composition includes a polyalkenyl phenol resin (A) and an aromatic polymaleimide compound (B). Polyalkenyl phenol resin (A) has at least one aromatic ring unit (a1) which may have a 2-alkenyl group bonded thereto and in which a phenolic hydroxyl group is alkyl-etherified, and at least one aromatic ring unit (a2) which has a phenolic hydroxyl group and which may have a 2-alkenyl group bonded thereto. At least one of aromatic ring units (a1, a2) has a 2-alkenyl group. Each aromatic ring unit is bonded by a linking group. When m represents the number of aromatic ring units (a1), and n represents the number of aromatic ring units (a2), n to (m+n) is 10-60%. The polyalkenyl phenol resin (A) is included in an amount at which the amount of 2-alkenyl groups becomes 0.4-1.5 mol per mol of maleimide groups in the aromatic polymaleimide compound (B).

15 Claims, No Drawings

THERMOSETTING RESIN COMPOSITION

CROSS REFERENCE TO RELATED APPLICATIONS

This application is a National Stage of International Application No. PCT/JP2015/084838 filed Dec. 11, 2015 (claiming priority based on Japanese Patent Application No. 2014-263515 filed Dec. 25, 2014), the contents of which are incorporated herein by reference in their entirety.

TECHNICAL FIELD

The present invention relates to a thermosetting resin composition. More specifically, it relates to a thermosetting resin composition that has excellent workability during molding, that is suitable as a sealing material for a semiconductor in a power device or the like, and that when cured after molding exhibits excellent mechanical strength and heat resistance.

BACKGROUND ART

Power devices that are low loss, compact, highly functional devices capable of operating with high current and high voltage are most promising as next-generation semiconductors. As development of such devices continues to advance in recent years, the requirements for sealing materials for Si, SiC or GaN devices have become ever more stringent. In particular, there is high demand for use in high-temperature environments, i.e., greater heat resistance, to allow driving at higher power. Relatively high heat-resistant polyimide resins, silicone gels and high heat-resistant epoxy resins have therefore been used in the prior art as sealing materials for power devices.

Polyimide resins (with glass transition temperatures of 350° C. or higher) have high heat resistance but also poor workability, requiring high temperatures and long time periods for molding. Silicone gels (with glass transition temperatures of 400° C. or higher, or else not observed) are used in potting-type molding and therefore require cases that can support their shapes during molding, and the resins themselves are expensive, rendering them disadvantageous in terms of cost and productivity. Heat-resistant epoxy resins (glass transition temperatures of 100 to 200° C.) have excellent workability but are inferior to the aforementioned two types of materials in terms of heat resistance, including high-temperature mechanical properties and electrical characteristics. Moreover, since heat-resistant epoxy resins have special structures with a naphthalene backbone or tetraphenyl backbone, they are costly and limited in their practicality.

On the other hand, thermosetting resins with high heat resistance are known, namely compositions including an alkenylphenol compound and an aromatic bismaleimide compound (for example, see Patent Document 1 (Japanese Unexamined Patent Publication No. H5-43630) and Patent Document 2 (Japanese Unexamined Patent Publication No. H6-93047)). A cured resin with high heat resistance can be obtained by radical polymerization between the alkenyl groups of the alkenylphenol compound and the unsaturated groups of the aromatic bismaleimide compound, to produce a high degree of crosslinking. Such a thermosetting resin (having a glass transition temperature of 200 to 350° C.) has heat resistance that is inferior to that of a polyimide resin or silicone gel, but still exhibits higher heat resistance than a heat-resistant epoxy resin while also allowing transfer molding similar to epoxy resins, and therefore such resins are known to exhibit both heat resistance and molding workability.

However, since compositions including alkenylphenol compounds and aromatic bismaleimide compounds have higher crosslinking point density than epoxy resins, the impact resistance of their cured products are low due to a high flexural modulus, and therefore when cured they are hard and brittle. Moreover, when the compositions are used as sealing resins, because of the phenolic hydroxyl group in the alkenylphenol compound that remains without contributing to polymerization, the high-temperature electrical characteristics, the heat degradation resistance and the humidity resistance of the sealed apparatus may be impaired.

In order to solve these problems, Patent Document 3 (Japanese Unexamined Patent Publication No. S62-280254) discloses a thermosetting resin composition comprising an allyl etherified substituted phenolic novolak resin wherein the phenolic hydroxyl group in an alkenyl (allyl) phenol has been alkenyl (allyl) etherified, a N,N'-bismaleimide compound, and an epoxy resin.

However, the aforementioned thermosetting resin composition cannot provide a cured product with high heat resistance because it includes an epoxy resin. Furthermore, Claisen rearrangement reaction proceeds under high-temperature conditions in alkenyl ether compounds. This results in problems such as low long-term heat resistance of the cured product due to the chemical instability of the allyl ether groups remaining after curing of the composition, and a large degree of cure shrinkage.

PRIOR ART DOCUMENTS

Patent Documents

[Patent Document 1] Japanese Unexamined Patent Publication No. H5-43630
[Patent Document 2] Japanese Unexamined Patent Publication No. H6-93047
[Patent Document 3] Japanese Unexamined Patent Publication No. S62-280254

DISCLOSURE OF THE INVENTION

Problems to be Solved by the Invention

In light of the current situation, it is an object of the present invention to provide a thermosetting resin composition with which it is possible to obtain a highly reliable cured product with excellent humidity resistance, heat resistance and mechanical strength when cured.

Means for Solving the Problems

As a result of diligent research, the present inventors have found that a composition including a phenol resin that has a specific basic backbone wherein aromatic rings having a phenolic hydroxyl group in the molecule are partially alkylated, i.e., having alkyl groups bonded to the aromatic rings, in a prescribed proportion, and an aromatic polymaleimide compound, provides a thermosetting resin composition with excellent humidity resistance, heat resistance and mechanical strength.

Specifically, the invention encompasses the following aspects.

[1] A thermosetting resin composition comprising (A) a polyalkenylphenol resin and (B) an aromatic polymaleimide compound, wherein the polyalkenylphenol resin (A) has in the molecule at least one each of (a1) an aromatic ring unit with an alkyl-etherified phenolic hydroxyl group and with or without a 2-alkenyl group bonded thereto, and (a2) an aromatic ring unit with a phenolic hydroxyl group and with or without a 2-alkenyl group bonded thereto, at least some of the aromatic ring units (a1) and/or (a2) having a 2-alkenyl group, each aromatic ring unit being bonded by a linking group, wherein the ratio of n to (m+n) is 10 to 60% where m is the number of aromatic ring units of (a1) and n is the number of aromatic ring units of (a2), and wherein the thermosetting resin composition comprises the polyalkenylphenol resin (A) in an amount such that the proportion of 2-alkenyl groups is 0.4 to 1.5 mol relative to 1 mol of maleimide groups in the aromatic polymaleimide compound (B).

[2] A thermosetting resin composition according to [1], wherein the aromatic ring unit of (a1) is a structural unit represented by formula (1) and the aromatic ring unit of (a2) is a structural unit represented by formula (2):

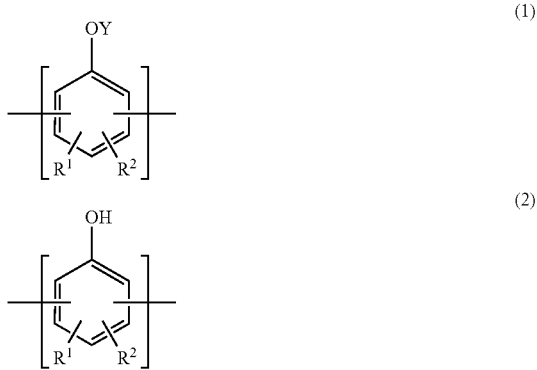

wherein, in formulas (1) and (2), each $R^1$ independently is a hydrogen atom, an alkyl group having 1 to 5 carbon atoms or an alkoxy group having 1 to 5 carbon atoms, each $R^2$ independently is a hydrogen atom, an alkyl group having 1 to 5 carbon atoms, an alkoxy group having 1 to 5 carbon atoms or a 2-alkenyl group represented by formula (3):

wherein, in formula (1), Y is an alkyl group having 1 to 5 carbon atoms, and in formula (3), $R^5$, $R^6$, $R^7$, $R^8$ and $R^9$ each independently are a hydrogen atom, an alkyl group having 1 to 5 carbon atoms, a cycloalkyl group having 5 to 10 carbon atoms or an aryl group having 6 to 12 carbon atoms, the symbol "*" in formula (3) representing a binding site with a carbon atom composing the aromatic ring.

[3] A thermosetting resin composition according to [2], wherein the linking group is a divalent linking group represented by formula (4):

-Q- (4)

wherein each Q independently is an alkylene group represented by the formula $CR^3R^4$, a cycloalkylene group having 5 to 10 carbon atoms, a divalent organic group having an aromatic ring having 6 to 14 carbon atoms, a divalent organic group having an alicyclic fused ring having 7 to 10 carbon atoms, or a divalent group that is a combination thereof, and $R^3$ and $R^4$ each independently are a hydrogen atom, an alkyl group having 1 to 5 carbon atoms, an alkenyl group having 2 to 6 carbon atoms, a cycloalkyl group having 5 to 10 carbon atoms or an aryl group having 6 to 12 carbon atoms.

[4] A thermosetting resin composition according to [3], wherein Q in formula (4) is $CH_2$.

[5] A thermosetting resin composition according to any one of [2] to [4], wherein the 2-alkenyl group represented by formula (3) is bonded to the carbon atom at the ortho position or the para position relative to the phenolic hydroxyl group.

[6] A thermosetting resin composition according to any one of [2] to [5], wherein the 2-alkenyl group represented by formula (3) is an allyl group.

[7] A thermosetting resin composition according to any one of [1] to [6], wherein the number-average molecular weight of the polyalkenylphenol resin (A) is 750 to 5000.

[8] A thermosetting resin composition according to any one of [1] to [7], wherein the aromatic polymaleimide compound (B) is an aromatic bismaleimide compound having a maleimidephenyl group.

[9] A thermosetting resin composition according to any one of [1] to [8], further comprising (C) a polymerization initiator.

[10] A thermosetting resin composition according to [9], wherein the polymerization initiator (C) is an organic peroxide.

[11] A thermosetting resin composition according to [9] or [10], wherein the thermosetting resin composition comprises 0.1 to 5 parts by mass of the polymerization initiator (C) relative to 100 parts by mass of the total amount of the polyalkenylphenol resin (A) and the aromatic polymaleimide compound (B).

[12] A thermosetting resin composition according to any one of [1] to [11], further comprising a filler.

[13] A thermosetting resin composition according to [12], wherein the filler is an inorganic filler selected from the group consisting of amorphous silica, crystalline silica, alumina, boron nitride, aluminum nitride, silicon nitride, and mixtures thereof.

Effects of the Invention

According to the invention it is possible to provide a thermosetting resin composition with excellent humidity resistance, heat resistance and mechanical strength, and an electronic component obtained by using the composition. In particular, when used as a semiconductor sealing material in a power device or the like, it is possible to produce a molded article having high humidity resistance, heat resistance and mechanical strength after molding.

MODE FOR CARRYING OUT THE INVENTION

The invention will now be explained in greater detail. The thermosetting resin composition of the invention comprises a polyalkenylphenol resin (A) and an aromatic polymaleimide compound (B). These components will now be explained in detail.

(A) Polyalkenylphenol Resin

The polyalkenylphenol resin (A) used in the thermosetting resin composition of the invention has in the molecule at least one each of (a1) an aromatic ring unit with an alkyl-etherified phenolic hydroxyl group and with or without a 2-alkenyl group bonded thereto, and (a2) an aromatic ring unit with a phenolic hydroxyl group and with or without a 2-alkenyl group bonded thereto, at least some of the aromatic ring units (a1) and/or (a2) having a 2-alkenyl group, each aromatic ring unit being bonded by a linking group, wherein the ratio of n to (m+n) is 10 to 60% where m is the number of aromatic ring units of (a1) and n is the number of aromatic ring units of (a2), and wherein the thermosetting resin composition comprises the polyalkenylphenol resin (A) in an amount such that the proportion of 2-alkenyl groups is 0.4 to 1.5 mol relative to 1 mol of maleimide groups in the aromatic polymaleimide compound (B). If the ratio of n to (m+n) exceeds 60%, the flow property during molding will be reduced and the hygroscopicity of the cured product (molded article) will also increase. If the ratio of n to (m+n) is less than 10%, on the other hand, the moldability during curing will be reduced and the cured product will be hard and brittle.

The basic backbone composing the polyalkenylphenol resin (A) may include a backbone of a known phenol resin, such as a phenol-novolak resin, cresol-novolak resin, triphenylmethane-type phenol resin, phenolaralkyl resin, biphenylaralkylphenol resin or phenol-dicyclopentadiene copolymer resin.

The polyalkenylphenol resin (A) is a compound having a structure in which 40 to 90%, preferably 50 to 88% and more preferably 60 to 85% of the hydrogen atoms in the phenolic hydroxyl groups in the corresponding phenol resin molecule are substituted with alkyl groups (alkyl etherified). Stated differently, 10 to 60%, preferably 12 to 50% and more preferably 15% to 40% of the phenolic hydroxyl groups in the corresponding phenol resin molecule of the polyalkenylphenol resin (A) remain as phenolic hydroxyl groups without alkyl etherification.

Provided that k is the number of aromatic ring units with 2-alkenyl groups bonded thereto in the polyalkenylphenol resin (A), the ratio of k to the total of the number m of aromatic ring units of (a1) and the number n of aromatic ring units of (a2), i.e., (m+n), is 40 to 100%, preferably 60 to 100% and more preferably 80 to 100%. Aromatic ring units with 2-alkenyl groups bonded thereto are a subset of aromatic ring units of (a1) and/or aromatic ring units of (a2).

In some embodiments, the 2-alkenyl group is bonded to 40 to 100%, preferably 60 to 100% and more preferably 80 to 100% of the aromatic ring units among the aromatic ring units of (a1).

In some embodiments, the 2-alkenyl group is bonded to 40 to 100%, preferably 60 to 100% and more preferably 80 to 100% of the aromatic ring units among the aromatic ring units of (a2).

Preferred among these are compounds wherein the aromatic ring unit of (a1) is a structural unit represented by formula (1), and the aromatic ring unit of (a2) is a structural unit represented by formula (2). Since the polyalkenylphenol resin (A) is typically a mixture of compounds with different numbers of aromatic ring units of (a1) and/or numbers of aromatic ring units of (a2), i.e., it has a molecular weight distribution, in the examples provided below the number m of structural units represented by formula (1) and the number n of structural units represented by formula (2), as calculated from the number-average molecular weight will be shown for reference.

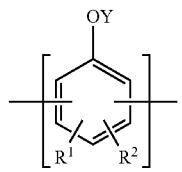

(1)

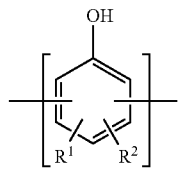

(2)

In formulas (1) and (2), each $R^1$ independently is a hydrogen atom, an alkyl group having 1 to 5 carbon atoms or an alkoxy group having 1 to 5 carbon atoms, each $R^2$ independently is a hydrogen atom, an alkyl group having 1 to 5 carbon atoms, an alkoxy group having 1 to 5 carbon atoms or a 2-alkenyl group represented by formula (3):

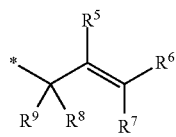

(3)

in formula (1), Y is an alkyl group having 1 to 5 carbon atoms, and in formula (3), $R^5$, $R^6$, $R^7$, $R^8$ and $R^9$ each independently are a hydrogen atom, an alkyl group having 1 to 5 carbon atoms, a cycloalkyl group having 5 to 10 carbon atoms or an aryl group having 6 to 12 carbon atoms, the symbol "*" in formula (3) representing a binding site with a carbon atom composing the aromatic ring.

When the polyalkenylphenol resin (A) has a plurality of either or both of the structural units represented by formula (1) and the structural units represented by formula (2), there is no particular restriction on the order of bonding of the structural units, but rather than having a structure in which a plurality of one of the units is contiguously bonded, it is preferred for them to be either randomly or alternately bonded each via a linking group. The $R^1$ and/or $R^2$ groups in a plurality of the structural units may be the same or different. At least some of the $R^2$ groups in the structural units represented by formula (1) and the structural units represented by formula (2) composing the polyalkenylphenol resin (A) are 2-alkenyl groups.

Specific examples of alkyl groups having 1 to 5 carbon atoms to form groups $R^1$ and $R^2$ in formula (1) and formula (2) include methyl, ethyl, n-propyl, isopropyl, n-butyl, sec-butyl, t-butyl and n-pentyl. Specific examples of alkoxy groups having 1 to 5 carbon atoms include methoxy, ethoxy, n-propoxy, isopropoxy, n-butoxy, sec-butoxy, t-butoxy and n-pentoxy. Incidentally, the term "each independently" means that multiple $R^1$ and $R^2$ groups may be the same or different. The same applies for the linking group Q described below.

Specific examples of alkyl groups having 1 to 5 carbon atoms to form groups $R^5$, $R^6$, $R^7$, $R^8$ and $R^9$ in formula (3) representing $R^2$ in formula (1) and formula (2) include methyl, ethyl, n-propyl, isopropyl, n-butyl, sec-butyl, t-butyl and n-pentyl. Specific examples of cycloalkyl groups having 5 to 10 carbon atoms include cyclopentyl, cyclohexyl, methylcyclohexyl and cycloheptyl. Specific examples of aryl groups having 6 to 12 carbon atoms include phenyl, methylphenyl, ethylphenyl, biphenyl and naphthyl. The 2-alkenyl group $R^2$ represented by formula (3) is preferably allyl, or in other words, preferably $R^5$, $R^6$, $R^7$, $R^8$ and $R^9$ are all hydrogen atoms.

Specific examples of alkyl groups having 1 to 5 carbon atoms to form group Y in formula (1) include methyl, ethyl, n-propyl, isopropyl, n-butyl, sec-butyl, t-butyl and n-pentyl.

In the polyalkenylphenol resin (A), the structural unit represented by formula (1) and the structural unit represented by formula (2) are bonded by a linking group. The linking group is preferably a divalent linking group represented by formula (4):

-Q- (4)

wherein each Q independently is an alkylene group represented by the formula $CR^3R^4$, a cycloalkylene group having 5 to 10 carbon atoms, a divalent organic group having an aromatic ring having 6 to 14 carbon atoms, a divalent organic group having an alicyclic fused ring having 7 to 10 carbon atoms, or a divalent group that is a combination thereof, and $R^3$ and $R^4$ each independently are a hydrogen atom, an alkyl group having 1 to 5 carbon atoms, an alkenyl group having 2 to 6 carbon atoms, a cycloalkyl group having 5 to 10 carbon atoms or an aryl group having 6 to 12 carbon atoms.

Specific examples of cycloalkylene groups having 5 to 10 carbon atoms to form the linking group Q in formula (4) include cyclopentylene, cyclohexylene, methylcyclohexylene and cycloheptylene. Specific examples of divalent organic groups with aromatic rings having 6 to 14 carbon atoms include phenylene, tolylene, naphthylene, biphenylene, fluorenylene, anthranylene, xylylene and 4,4-methylenediphenyl. A specific example of a divalent organic group with an alicyclic fused ring having 7 to 10 carbon atoms is dicyclopentadienylene. For $R^3$ and $R^4$, specific examples of alkyl groups having 1 to 5 carbon atoms include methyl, ethyl, n-propyl, isopropyl, n-butyl, sec-butyl, t-butyl and n-pentyl, specific examples of alkenyl groups having 2 to 6 carbon atoms include vinyl, allyl, butenyl, pentenyl and hexenyl, specific examples of cycloalkyl groups having 5 to 10 carbon atoms include cyclopentyl, cyclohexyl, methylcyclohexyl and cycloheptyl, and specific examples of aryl groups having 6 to 12 carbon atoms include phenyl, methylphenyl, ethylphenyl, biphenyl and naphthyl.

Preferred among these are compounds in which the linking group Q is $CR^3R^4$, and more preferred is $CH_2$, from the viewpoint of low viscosity and low cost.

The preferred number-average molecular weight for the polyalkenylphenol resin (A) used for the invention is 750 to 5000 and more preferably 1000 to 3000. If the number-average molecular weight is less than 750, the thermal decomposition initiation temperature at high temperature will tend to be lower, and if it is greater than 5000, the viscosity will be high, thus tending to impair the workability during molding. The number-average molecular weight is determined by the method described in the examples below.

The polyalkenylphenol resin (A) used for the invention can be obtained by alkenyl etherification of some of the hydroxyl groups of the starting phenol resin, and rearrangement of the 2-alkenyl group to the ortho position or the para position by Claisen rearrangement reaction, and alkylation of some of the resulting, regenerated phenolic hydroxyl groups. According to one embodiment of the invention, therefore, $R^2$ as the 2-alkenyl group represented by formula (3) is bonded to the carbon atom at the ortho position or para position of the aromatic ring, relative to the phenolic hydroxyl group. The starting phenol resin used may be a known phenol resin, preferably having a structure represented by the following formula (5).

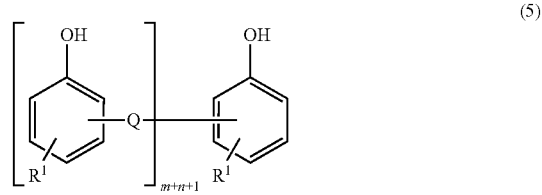

In formula (5), $R^1$ is identical to $R^1$ in formula (1) and formula (2), and Q is identical to formula (4). The letter m corresponds to the number m of structural units represented by formula (1), and the letter n corresponds to the number n of structural units represented by formula (2).

Specific examples of starting phenol resins include phenol-novolak resins, cresol-novolak resins, triphenylmethane-type phenol resins, phenolaralkyl resins, biphenylaralkylphenol resins and phenol-dicyclopentadiene copolymer resins. From the viewpoint of viscosity reduction, it is preferred to use a phenol-novolak resin or cresol-novolak resin in which Q in formula (5) is $CH_2$.

The 2-alkenyl etherification reaction of the phenol resin may be, for example, one of the following two methods: (i) a known method to react a halogenated 2-alkenyl compound such as allyl chloride, methallyl chloride or allyl bromide and a phenol compound, or (ii) a method to react a 2-alkenyl carboxylate compound such as allyl acetate and a phenol compound. A 2-alkenyl etherification reaction using a halogenated 2-alkenyl compound may employ the method described in Japanese Unexamined Patent Publication No. H2-91113, for example. The method to react the 2-alkenyl carboxylate compound and phenol resin may be the method described in Japanese Unexamined Patent Publication No. 2011-26253, for example. Because the thermosetting resin composition of the invention is required to exhibit long-term insulating ability, it is preferred to use a phenol resin prepared by the method of (ii) above, which does not include a halogenated compound derived from a halogenated 2-alkenyl compound, which can potentially have an adverse effect on long-term insulating performance.

The amount of halogenated 2-alkenyl compound or 2-alkenyl carboxylate compound used is preferably 0.5 to 2.5 equivalents, more preferably 0.8 to 2.0 equivalents and even more preferably 1.0 to 1.5 equivalents, relative to the phenolic hydroxyl groups. If it is less than 0.5 equivalents, fewer reactive sites with the aromatic polymaleimide compound (B) will be present after Claisen rearrangement, and the mechanical strength of a cured product after molding will tend to be lower. If it is less than 1.0 equivalents, the final target after the alkylation reaction described below will include compounds without 2-alkenyl groups bonded to the aromatic ring unit of (a1) and/or the aromatic ring unit of (a2). In such cases, structural units will be included wherein, for example, $R^2$ of formula (1) or formula (2) is not a 2-alkenyl group. The 2-alkenyl etherification reaction is carried out by mixing a 2-alkenyl compound with the starting phenol resin, and reacting them for 4 to 40 hours. A solvent that dissolves the starting phenol resin can be used in the 2-alkenyl etherification reaction. Alternatively, a 2-alkenyl carboxylate compound that can dissolve the starting phenol resin can be used to carry out the reaction under solventless conditions. When some of the phenolic hydroxyl groups are to intentionally remain intact, the reaction rate (conversion rate) of the 2-alkenyl compound can be limited to a low level by using a larger amount of the halogenated 2-alkenyl compound or 2-alkenyl carboxylate compound than the amount specified above, and shortening the reaction time to be less than the reaction time specified above.

The target polyalkenylphenol resin (A) can be obtained by Claisen rearrangement of a polyalkenyl ether resin produced by the method of (i) or (ii) above. Claisen rearrangement reaction can be conducted by heating the polyalkenyl ether resin at a temperature of 100 to 250° C. and carrying out reaction for 1 to 20 hours. The Claisen rearrangement reaction can be conducted using a high-boiling-point solvent, or under solventless conditions. An inorganic salt such as sodium thiosulfate or sodium carbonate can also be added to accelerate the rearrangement reaction. The details in this regard are disclosed in Japanese Unexamined Patent Publication No. H2-91113, for example.

Since phenolic hydroxyl groups are regenerated by Claisen rearrangement reaction, some of the regenerated phenolic hydroxyl groups may then be etherified by alkylation reaction to obtain the target polyalkenylphenol resin (A). The etherification method may be one of two methods: (i) a known method to react an alkyl halide compound such as alkyl chloride, alkyl bromide or alkyl iodide and phenolic hydroxyl groups, or (ii) a method to react an alkyl sulfate ester compound such as dimethyl sulfate and phenolic hydroxyl groups. Because the thermosetting resin composition of the invention is required to exhibit long-term insulating ability, it is preferred to use the method of (ii) above, that does not include a halogenated compound derived from an alkyl halide compound, which can potentially have an adverse effect on long-term insulating performance.

The amount of an alkyl halide compound or alkyl sulfate ester compound used is preferably 0.4 to 0.95 equivalents and more preferably 0.6 to 0.9 equivalents, relative to the phenolic hydroxyl groups. At less than 0.4 equivalents, there will be a greater residue of unreacted hydroxyl groups during reaction with the aromatic polymaleimide compound (B), thereby lowering the humidity resistance of the cured product after molding. At greater than 0.95 equivalents, the curing reaction will be insufficient, resulting in a hard, brittle cured product. The alkylation reaction is preferably carried out for 2 to 40 hours. The reaction will not be completed within less than 2 hours, and the productivity will be low at longer than 40 hours.

In the production steps for the polyalkenylphenol resin (A), the phenolic hydroxyl groups of the starting phenol resin are 2-alkenyl etherified and subjected to Claisen rearrangement reaction, after which the regenerated phenolic hydroxyl groups are partially alkylated. Alternatively, the polyalkenylphenol resin (A) can be produced by partial alkylation of the phenolic hydroxyl groups of the starting phenol resin followed by 2-alkenyl etherification of the remaining phenolic hydroxyl groups and Claisen rearrangement reaction.

(B) Aromatic Polymaleimide Compound

The aromatic polymaleimide compound (B) used in the thermosetting resin composition of the invention is an essential component for providing a cured product with heat resistance by polymerizing and curing with a polyalkenylphenol resin by radical reaction, and heating at 150 to 300° C. An aromatic polymaleimide compound is a compound having two or more maleimide groups, with the maleimide groups bonded to an aromatic ring. The aromatic ring may be a monocyclic ring such as benzene, or a fused ring such as naphthalene or anthracene. Specific examples for the aromatic polymaleimide compound (B) include bismaleimides such as bis(4-maleimidephenyl)methane, trismaleimides such as tris(4-maleimidephenyl)methane, tetrakismaleimides such as bis(3,4-dimaleimidephenyl)methane and aromatic polymaleimides such as poly(4-maleimidestyrene), with aromatic bismaleimide compounds being preferred. Specific examples of aromatic bismaleimide compounds include bis(4-maleimidephenyl)methane, bis(3-maleimidephenyl)methane, bis(3-methyl-4-maleimidephenyl)methane, bis(3,5-dimethyl-4-maleimidephenyl)methane, bis(3-ethyl-4-maleimidephenyl)methane, bis(3,5-diethyl-4-maleimidephenyl)methane, bis(3-propyl-4-maleimidephenyl)methane, bis(3,5-dipropyl-4-maleimidephenyl)methane, bis(3-butyl-4-maleimidephenyl)methane, bis(3,5-dibutyl-4-maleimidephenyl)methane, bis(3-ethyl-4-maleimide-5-methylphenyl)methane, 2,2-bis(4-maleimidephenyl)propane, 2,2-bis[4-(4-maleimidephenyloxy)phenyl]propane, bis(4-maleimidephenyl)ether, bis(3-maleimidephenyl)ether, bis(4-maleimidephenyl)ketone, bis(3-maleimidephenyl)ketone, bis(4-maleimidephenyl)sulfone, bis(3-maleimidephenyl)sulfone, bis[4-(4-maleimidephenyloxy)phenyl]sulfone, bis(4-maleimidephenyl)sulfide, bis(3-maleimidephenyl)sulfide, bis(4-maleimidephenyl)sulfoxide, bis(3-maleimidephenyl)sulfoxide, 1,4-bis(4-maleimidephenyl)cyclohexane, 1,4-dimaleimidenaphthalene, 2,3-dimaleimidenaphthalene, 1,5-dimaleimidenaphthalene, 1,8-dimaleimidenaphthalene, 2,6-dimaleimidenaphthalene, 2,7-dimaleimidenaphthalene, 4,4'-dimaleimidebiphenyl, 3,3'-dimaleimidebiphenyl, 3,4'-dimaleimidebiphenyl, 2,5-dimaleimide-1,3-xylene, 2,7-dimaleimidefluorene, 9,9-bis(4-maleimidephenyl)fluorene, 9,9-bis(4-maleimide-3-methylphenyl)fluorene, 9,9-bis(3-ethyl-4-maleimidephenyl)fluorene, 3,7-dimaleimide-2-methoxyfluorene, 9,10-dimaleimidephenanthrene, 1,2-dimaleimideanthraquinone, 1,5-dimaleimideanthraquinone, 2,6-dimaleimideanthraquinone, 1,2-dimaleimidebenzene, 1,3-dimaleimidebenzene, 1,4-dimaleimidebenzene, 1,4-bis(4-maleimidephenyl)benzene, 2-methyl-1,4-dimaleimidebenzene, 2,3-dimethyl-1,4-dimaleimidebenzene, 2,5-dimethyl-1,4-dimaleimidebenzene, 2,6-dimethyl-1,4-dimaleimidebenzene, 4-ethyl-1,3-dimaleimidebenzene, 5-ethyl-1,3-dimaleimidebenzene, 4,6-dimethyl-1,3-dimaleimidebenzene, 2,4,6-trimethyl-1,3-dimaleimidebenzene, 2,3,5,6-tetramethyl-1,4-dimaleimidebenzene and 4-methyl-1,3-dimaleimidebenzene. An example of a commercial product is the BMI Series (trade name of Daiwa Fine Chemicals Co., Ltd.). Preferred among these are aromatic bismaleimide compounds with maleimidephenyl groups, because they are inexpensive and readily available, and have high universal utility, and when mixed in compositions, they melt at temperatures of about 100° C. and exhibit satisfactory mixed dispersibility.

The thermosetting resin composition contains the polyalkenylphenol resin (A) in an amount such that the proportion of 2-alkenyl groups is 0.4 to 1.5 mol and preferably 0.5 to 1.0 mol relative to 1 mol of maleimide groups in the aromatic polymaleimide compound (B). At less than 0.4 mol, the heat resistance and/or mechanical strength will tend to be reduced. At greater than 1.5 mol, the elastic modulus will increase, resulting in a cured product being fragile and easy to be broken.

(C) Polymerization Initiator

Since curing of the thermosetting resin composition of the invention is accomplished by radical polymerization, it is preferred to add a polymerization initiator (C), the polymerization initiator (C) preferably being a thermal radical generator. Thermal radical generators include organic peroxides, azo-based compounds, phosphorus-based compounds and redox initiators. Organic peroxides include dicumyl peroxide, 2,5-dimethyl-2,5-di(tert-butylperoxy) hexane, tert-butylcumyl peroxide, di-tert-butyl peroxide, 1,1,3,3-tetramethylbutyl hydroperoxide and cumene hydroperoxide. Azo-based compounds include azobisisobutyronitrile, 1,1'-azobis(cyclohexanecarbonitrile) and diethyl azodicarboxylate. Phosphorus-based compounds include triphenylphosphine, tri-o-tolylphosphine, tri-m-tolylphosphine, tris(p-methoxyphenyl)phosphine, tricyclohexylphosphine and tri-tert-butylphosphine. Redox initiators include combinations of organic peroxides (oxidizing agents) including organic hydroperoxides such as cumene hydroperoxide, dialkyl peroxides such as dicumyl peroxide, diacyl peroxides such as diacetyl peroxide and dibenzoyl peroxide, peroxidated esters such as t-butyl peroxyneodecanoate and t-butyl peroxypivalate, and reducing agents including tertiary amines such as triethylamine and N,N-dimethylaniline, aromatic thiol compounds such as mercaptobenzimidazole, organic acid metal salts such as copper acetate and copper naphthenate, metal chelate compounds such as vanadyl acetylacetonate and copper acetylacetonate, metal sulfides such as copper sulfide and manganese sulfide, and metal oxides such as copper oxide. Preferred among these are organic peroxides, since they have high curing reaction rates, can provide molding in short time periods, and have high storage stability.

The preferred amount used of the polymerization initiator (C) is 0.1 to 5 parts by mass and more preferably 0.5 to 3 parts by mass, relative to 100 parts by mass of the total amount of the polyalkenylphenol resin (A) and the aromatic polymaleimide compound (B). At less than 0.1 part by mass the curing reaction will not be adequately promoted, and at greater than 5 parts by mass, the storage stability will tend to be reduced.

[Other Components]

The thermosetting resin composition of the invention may also contain other additives as necessary, within ranges that do not interfere with the curing property. Fillers may be mentioned as typical examples of additives. The types of fillers used may be selected as appropriate for the purpose of use. For example, when the thermosetting resin composition of the invention is used for sealing of a semiconductor, usually an inorganic filler with an insulating property is added to reduce the thermal expansion coefficient of the cured product. There are no particular restrictions on the inorganic filler, and any publicly known one may be used.

Specific examples of inorganic fillers include particles of amorphous silica, crystalline silica, alumina, boron nitride, aluminum nitride and silicon nitride. From the viewpoint of viscosity reduction, spherical amorphous silica is preferred. The inorganic filler may be surface treated with a silane coupling agent or the like, or it may be one that has not been surface treated. The mean particle diameter of the inorganic filler is 0.1 to 20 µm, and preferably the maximum particle diameter is not greater than 50 µm and especially not greater than 20 µm. If the mean particle diameter is within this range, the viscosity of the thermosetting resin composition will not be too high, and injectability into narrow-pitch wiring sections and narrow gap sections will be suitable. The mean particle diameter referred to herein is the volume cumulative particle diameter $D_{50}$ measured with a laser diffraction-scattering particle diameter distribution analyzer. The content of the inorganic filler in the thermosetting resin composition can be determined as appropriate for the purpose of use. For example, for semiconductor sealing purposes, the content of the inorganic filler in the thermosetting resin composition is usually 50 to 95 mass % and preferably 65 to 90 mass %.

The thermosetting resin composition of the invention may contain a coupling agent for improved adhesiveness between the resin and the filler, substrate or element. The coupling agent is not particularly restricted, and examples include silane coupling agents such as vinyltriethoxysilane, vinyltrimethoxysilane, 3-glycidoxypropyltrimethoxysilane, γ-methacryloxypropyltrimethoxysilane, γ-aminopropyltrimethoxysilane and N-phenyl-3-aminopropyltrimethoxysilane. A single coupling agent may be used, or two or more may be used in combination. The content of the coupling agent is preferably 0.1 to 5 parts by mass relative to 100 parts by mass of the inorganic filler. If it is less than 0.1 part by mass, the effect of the coupling agent may not be adequately exhibited, and if it is greater than 5 parts by mass, the excess coupling agent may volatilize off, resulting in reduction of the film thickness when the thermosetting resin composition has been cured.

The thermosetting resin composition of the invention may also contain other additives such as antifoaming agents, coloring agents, fluorescent materials, modifying agents, leveling agents, light diffusion agents and flame retardants, as necessary, in ranges that do not adversely affect the properties of the cured product.

There are no particular restrictions on the method of preparing the thermosetting resin composition of the invention, and it can be prepared by loading and mixing in a mixer such as a pot mill, triple roll mill, rotating mixer, biaxial mixer or the like, with the components in the prescribed mixing proportion. During preparation, if necessary, an organic solvent may be combined and uniformly mixed with the composition, and then the organic solvent may be volatilized off. The organic solvent used may be selected as appropriate depending on, for example, the solubility of the organic components of the composition including the polyalkenylphenol resin (A), aromatic polymaleimide compound (B) and polymerization initiator (C), but preferably it is one that is easy to remove, such as acetone, toluene, THF or ethyl acetate. Strongly acidic solvents such as acetic acid and basic solvents such as triethylamine and pyridine are not preferred because they react with maleimide or hydroxyl groups. Solvents with a high boiling point, such as dimethylformamide and dimethyl sulfoxide, are not preferred due to the problem of residue of the organic solvent. When an organic solvent is used, preferably the organic solvent is removed under reduced pressure at the final step, to obtain the composition. When the composition is to be powdered, the method is not particularly specified so long as the resin does not melt by the heat generated by the operating steps, but for a small amount, it is convenient to use an agate mortar. When a commercially available pulverizer is employed, types that generate heat during pulverizing can cause melting of the mixture and are therefore unsuitable. The particle diameter of the powder may be up to about 1 mm, for example.

[Curing Method]

The thermosetting resin composition of the invention can be cured by heating. The thermosetting conditions are normally 150 to 300° C. Curing will not proceed sufficiently at a temperature of lower than 150° C. On the other hand, at a temperature of higher than 300° C., the composition may decompose and cause volatilization of the low-molecular-weight components, and it is an undesirable situation for the equipment. The heating time is preferably in the range of 0.5 to 48 hours. The heating may be divided and carried out in plural times. When an especially high degree of curing is desired then curing at an excessively high temperature is not preferred, but instead the temperature is raised as curing progresses, for example, to a final curing temperature of not higher than 250° C. and preferably not higher than 230° C.

EXAMPLES

The invention will now be explained in greater detail using examples and comparative examples, with the understanding that the invention is not limited to the examples.

The starting materials in the examples and comparative examples were as follows.

[Starting Materials]
SHONOL™ BRG-556: Phenol-novolak resin (number-average molecular weight: 600, weight-average molecular weight: 850) (product of Showa Denko K.K.)
SHONOL™ BRG-558: Phenol-novolak resin (number-average molecular weight: 1050, weight-average molecular weight: 1850) (product of Showa Denko K.K.)
BMI-1100H: 4,4'-diphenylmethanebismaleimide (bis(4-maleimidephenyl)methane) (product of Daiwa Fine Chemicals Co., Ltd.)
Percumyl™ D: dicumyl peroxide (product of NOF Corp.)
silica filler: MSR-5100 [spherical silica: mean particle diameter of 25.5 μm] (product of Tatsumori, Ltd.)
silane coupling agent: KBM-403 [3-glycidoxypropyltrimethoxysilane] (product of Shin-Etsu Chemical Co., Ltd.)

The analysis methods and characteristic evaluation methods used in the examples and comparative examples were as follows.

[Analysis Methods]
Measurement of Molecular Weight by GPC
The measuring conditions for GPC were as follows.
apparatus: Shodex™ GPC-101
column: Shodex™ KF-802, KF-803, KF-805
mobile phase: Tetrahydrofuran
flow rate: 1.0 mL/min
detector: Shodex™ RI-71
temperature: 40° C.

The number-average molecular weight and weight-average molecular weight were calculated based on a calibration curve prepared by using a polystyrene standard substance, under the measuring conditions specified above.

Allylation Rate

The allylation rate was calculated from $^1$H-NMR analysis. The hydrogen atoms at the meta position relative to the hydroxyl groups in the phenol compound of the starting material do not contribute to the reaction at any stage of the allyl etherification or Claisen rearrangement reaction. The integrated intensity (integrated intensity V1) of the signal for this hydrogen atom was used as an intramolecular internal standard, and the reaction rate at each stage was calculated by comparing V1 with the integrated intensity of the new signal after allyl etherification and Claisen rearrangement. For example, a signal for the methylene hydrogen atom in the allyl group is newly observed after allyl etherification. The value of V0, obtained when the integrated intensity of the signal for the methylene hydrogen atom in the allyl group observed when allyl etherification reaction had proceeded 100% by using an excess of allylation reagent (allyl acetate) had been normalized against V1, was defined as the maximum (100%) integrated intensity of the theoretically observed signal after 100% allyl etherification.

The reaction rate for allylation was calculated based on V0 by the formula: $(V2/V0) \times 100$, where V2 was obtained by normalizing the integrated intensity of the signal of the methylene hydrogen atom in the allyl group in the compound that had been allylated, against V1. The reaction rate for Claisen rearrangement was calculated in a similar manner based on the integrated intensity of the signal newly observed after Claisen rearrangement reaction. After Claisen rearrangement, a signal for the methylene hydrogen atom in the allyl group was observed at the higher magnetic field from the chemical shift of the signal for the methylene hydrogen atom in the allyl ether compound. The reaction rate for Claisen rearrangement reaction was calculated by the formula: $(V3/V0) \times 100$, where V3 was obtained by normalizing the integrated intensity of the signal for the newly produced methylene hydrogen atom, against V1. The measuring sample solution was prepared so that the signal/noise (S/N) ratio of the spectrum in $^1$H-NMR analysis exceeded 100. The fact that the S/N ratio was greater than 100 guarantees that the resolution in $^1$H-NMR analysis was ±1.0% or greater. However, since the observed signal was broad, the resolution in $^1$H-NMR analysis was judged to be about ±5%. In the examples, the allylation rate of the final target compound was recorded as an approximate value.

The 1H-NMR analysis was carried out under the following conditions.
Nuclear magnetic resonance ($^1$H-NMR) spectral analysis conditions
apparatus: BRUKER AVANCE400 (by Bruker)
solvent: deuterated chloroform
measuring temperature: 27° C.

Analysis of Alkylation Rate

After measuring the hydroxyl value by using a 2 g sample according to JISK0070, the hydroxyl equivalents were calculated. The hydroxyl value (W2) of the polyallylphenol resin (XA) obtained by Claisen rearrangement reaction and the hydroxyl value (W1) of the final target product (Synthetic Products A to F) obtained by alkylation reaction were measured, and the alkylation rate was calculated by the formula: $[1-(W1/W2)] \times 100[\%]$.

Flexural Strength and Elastic Modulus

Measurement was performed using a TENSILON tester (model: MSAT0002RTF/RTG) by A&D Co., Ltd.
test piece size: 100 mm×10 mm×3 mm A 3-point bending test was conducted 5 times, and the average value was calculated.

Glass Transition Temperature (Tg)

Measurement was performed using a thermomechanical analyzer (TMA). A TMA/SS6100 thermomechanical analyzer by SII NanoTechnology Inc. was used for measurement of a 8 mm×8 mm×3 mm test piece under conditions with a temperature range of 30 to 250° C., a temperature-elevating rate of 10° C./min and a load of 20.0 mN.

Water Absorption Rate

A 40 mm×40 mm×3 mm test strip was used to calculate a weight change rate under constant temperature and humidity conditions of 85° C., 1.2 atmospheres and 85% RH for 24 hours. Measurement was performed 5 times and the average value was calculated.

(1) Resin Synthesis

[Production Example 1-1] Production of Polyallylphenol Resin (Synthetic Product XA)

In a 1 L three-necked flask there were charged 201 g (1.45 mol) of potassium carbonate (product of Nippon Soda Co., Ltd.) as a solution dissolved in 150 g of purified water, and 150.0 g of the phenol-novolak resin SHONOL™ BRG-556 (product of Showa Denko K.K.), and the reactor was exchanged with nitrogen gas and heated to 85° C. After adding 204 g of allyl acetate (product of Showa Denko K.K.) (2.04 mol, 1.0 mol equivalents relative to the hydroxyl groups of the phenol-novolak resin (catalog value), 3.82 g (14.6 mmol) of triphenylphosphine (product of Hokko Chemical Industry Co., Ltd.) and 0.62 g of 50% water-containing 5%-Pd/C-STD (product of N.E. Chemcat Corp.) (0.291 mmol as Pd atoms), under a nitrogen gas stream, the temperature was increased to 105° C. in a nitrogen gas atmosphere for reaction for 4 hours, after which 29 g (0.291 mol) of allyl acetate was added and heating was continued for 10 hours. Stirring was then halted, and the mixture was allowed to stand for separation of the organic layer and aqueous layer into two layers. After adding purified water (200 g) to dissolve the precipitated salt, 200 g of toluene was added and the mixture was kept at about 80° C. while confirming no white deposit precipitation, after which the Pd/C was recovered by filtering (by using a 1 micrometer pore diameter membrane filter (KST-142-JA by Advantech, Inc.) with pressure at 0.3 MPa). The filter residue was rinsed with 100 g of toluene and the aqueous layer was separated. The organic layer was rinsed twice with 200 g of water, and the aqueous layer was confirmed to be neutral. After separating off the organic layer, it was concentrated under reduced pressure to obtain a phenol-novolak-type polyallyl ether resin in the form of a brown oil. The phenol-novolak-type polyallyl ether resin was then placed in a 500 mL flask with a mechanical stirrer set within it. The temperature was increased to 190° C. while stirring at 300 rpm, and Claisen rearrangement reaction was carried out for 10 hours to obtain a phenol-novolak-type polyallylphenol resin (Synthetic Product XA). The allylation rate of the polyallylphenol resin (Synthetic Product XA) was 100%, the number-average molecular weight was 880, and the weight-average molecular weight was 2400. Where the number of structural units represented by formula (1) in the polyallylphenol resin (Synthetic Product XA) is denoted as m and the number of structural units represented by formula (2) is denoted as n, calculation of (m+n) based on the number-average molecular weight resulted in a value of 6. Each $R^1$ was a hydrogen atom and each $R^2$ was an allyl group in formula (1) and formula (2).

[Production Example 1-2] Production of Polyallylphenol Resin (Synthetic Product A)

In a 1 L three-necked flask there were charged 146.6 g (1.06 mol) of potassium carbonate (product of Wako Pure Chemical Industries, Ltd.), 50.0 g of the polyallylphenol resin XA obtained in Production Example 1-1, and 30.1 g (0.2 mol) of methyl iodide (product of Wako Pure Chemical Industries, Ltd.), and the reactor was exchanged with nitrogen gas. Next, 300 mL of N,N-dimethylformamide (product of Wako Pure Chemical Industries, Ltd.) was added, the temperature was increased to 60° C. in a nitrogen gas atmosphere, and reaction was continued for 7 hours. Stirring was then halted and the mixture was allowed to cool to room temperature, after which the residue was filtered and then the filtrate was concentrated under reduced pressure. Distilled water (100 mL) was added to the concentrate, and the organic layer was separated off. After washing twice with addition of distilled water (100 mL) to the organic layer, the organic layer was concentrated under reduced pressure to obtain the target, a partially alkylated polyallylphenol resin, as a brown oil (44.0 g, 85% yield). The alkylation rate of the product was 50%, the number-average molecular weight was 910 and the weight-average molecular weight was 2550. The number of structural units m represented by formula (1) was 3 and the number of structural units n represented by formula (2) was 3, as calculated from the number-average molecular weight.

[Production Examples 2 to 6] Production of Polyallylphenol Resins (Synthetic Products B, C, D, E and F)

(Data for Changed Proportion of Alkylation Compared to Synthetic Product A)

Phenol-novolak-type polyallylphenol resins (Synthetic Products B, C, D, E and F) were obtained as reddish brown solids in the same manner as Production Examples 1-1 and 1-2, except for changing the amount of methyl iodide used.

The number-average molecular weights, weight-average molecular weights and ratio of n to (m+n) ([n/(m+n)]%) for each resin are shown in Table 1.

TABLE 1

| | Number-average molecular weight | Weight-average molecular weight | m | n | n/(m + n) |
|---|---|---|---|---|---|
| Synthetic Product A | 910 | 2550 | 3 | 3 | 50% |
| Synthetic product B | 930 | 2600 | 5.1 | 0.9 | 15% |
| Synthetic product C | 950 | 2800 | 6 | 0 | 0% |
| Synthetic product D | 890 | 2450 | 1.2 | 4.8 | 80% |
| Synthetic product E | 900 | 2500 | 1.8 | 4.2 | 70% |
| Synthetic product F | 880 | 2400 | 0 | 6 | 100% |

[Production Example 7] Production of Polyallylphenol Resin (Synthetic Product G)

A phenol-novolak-type polyallylphenol resin (Synthetic Product G) was obtained as a reddish brown solid in the same manner as Production Examples 1-1 and 1-2, except for using the phenol-novolak resin SHONOL™ BRG-558 (product of Showa Denko K.K.) instead of 150.0 g of the phenol-novolak resin SHONOL™ BRG-556. The hydroxyl equivalent of the polyallylphenol resin (Synthetic Product G) was 191, the number-average molecular weight was 1300 and the weight-average molecular weight was 5300. Where the number of structural units represented by formula (1) is denoted as m and the number of structural units represented by formula (2) is denoted as n, calculation based on the number-average molecular weight resulted in a value of 4 for m, a value of 4 for n and a value of 8 for (m+n). Each $R^1$ was a hydrogen atom and each $R^2$ was an allyl group in formula (1) and formula (2).

Examples 1 to 4 and Comparative Examples 1 to 8

(2) Evaluation of Thermosetting Resin Compositions

The polyallylphenol resins obtained by synthesis as described above and the components listed in Table 2 were mixed in the proportions listed in Table 2, and the mixture was melt kneaded (two rolls (8-inch roll diameter) by Toyo Seiki Co., Ltd., 110° C., 10 min). Each was then allowed to cool for 1 hour at room temperature (25° C.) for solidification, after which a mill mixer (model WB-1 by Osaka Chemical Co., Ltd., 25° C., 30 sec) was used for pulverizing to obtain the target powdered resin composition. The resin composition was subjected to hot press molding using a hot press machine (product of Toyo Seiki Co., Ltd., press pressure: 5 MPa, 180° C., 10 min), to produce a plate-shaped cured sample. The cured sample was used for measurement of the flexural modulus, the flexural strength and the water absorption rate, with the results shown in Table 3 below.

For all of the examples and comparative examples, BMI-1100H was used as the aromatic bismaleimide compound (B). A silica filler (MSR-5100) was added at a proportion of 75 mass % in the resin composition (3 times relative to the total amount of the resin portion), and KBM-403 was used as the silane coupling agent, added at 0.2 mass % relative to the silica filler.

TABLE 2

| | Polyallylphenol resin | | Polymerization initiator[2] | Filler |
|---|---|---|---|---|
| | Type | Molar ratio[1] | phr | Mass % |
| Example 1 | Synthetic Product A | 0.85 | 0.65 | 75 |
| Example 2 | Synthetic product B | 0.85 | 0.65 | 75 |
| Example 3 | Synthetic product B | 0.50 | 0.80 | 75 |
| Example 4 | Synthetic product B | 0.85 | 0.80 | 75 |
| Comp. Example 1 | Synthetic product C | 0.85 | 0.65 | 75 |
| Comp. Example 2 | Synthetic product D | 0.85 | 0.65 | 75 |
| Comp. Example 3 | Synthetic product E | 0.50 | 0.80 | 75 |
| Comp. Example 4 | Synthetic product E | 0.85 | 0.80 | 75 |
| Comp. Example 5 | Synthetic product E | 1.70 | 0.80 | 75 |
| Comp. Example 6 | Synthetic product B | 0.30 | 0.80 | 75 |
| Comp. Example 7 | Synthetic product F | 0.85 | 0.80 | 75 |

[1]Number of moles (molar ratio) of allyl groups in polyallylphenol resin relative to 1 mol of maleimide groups in aromatic bismaleimide compound (BMI-1100H)
[2]Parts by mass of polymerization initiator relative to 100 parts by mass of total amount of polyallylphenol resin and aromatic bismaleimide compound

TABLE 3

| | Tg (° C.) | Flexural modulus (GPa) | Flexural strength (MPa) | Water absorption rate (%) |
|---|---|---|---|---|
| Example 1 | 295 | 18.5 | 136.3 | 0.22 |
| Example 2 | 300 | 16.1 | 114.2 | 0.23 |
| Example 3 | 311 | 15.9 | 131.3 | 0.21 |
| Example 4 | 282 | 16.9 | 153.2 | 0.26 |
| Comp. Example 1 | 320 | 18.1 | 77.0 | 0.45 |
| Comp. Example 2 | 226 | 19.0 | 139.6 | 0.51 |
| Comp. Example 3 | 287 | 19.5 | 145.7 | 0.48 |
| Comp. Example 4 | 278 | 19.4 | 130.6 | 0.50 |
| Comp. Example 5 | 252 | 23.0 | 151.9 | 0.46 |
| Comp. Example 6 | 252 | 23.0 | 54.1 | 0.29 |
| Comp. Example 7 | 286 | 20.2 | 102.1 | 0.46 |

One major use of the thermosetting resin composition of the invention is a semiconductor sealing material for a power device. For use as a semiconductor sealing material, preferably the properties of the cured product satisfy the value ranges specified below.
glass transition temperature: ≥250° C.
flexural modulus: ≤19 GPa
flexural strength: ≥100 MPa
water absorption rate: ≤0.3%

While it is not necessary to satisfy all of these ranges, if one or more of the property ranges is not satisfied the balance of performance as a sealing material will be poor, and problems of moldability and heat resistance will be more likely to occur. In Comparative Example 1, the flexural strength was low and the water absorption rate was high. In Comparative Example 2, the glass transition temperature was low and the water absorption rate was high. In Comparative Examples 3 to 5 and 7, the flexural modulus was high and the water absorption rate was high. In Comparative Example 6, the flexural modulus was high and the flexural strength was low. In contrast, Examples 1 to 4 all satisfied all of the aforementioned conditions, indicating that they are suitable for use as semiconductor sealing materials.

INDUSTRIAL APPLICABILITY

According to the invention it is possible to provide a thermosetting resin composition with excellent humidity resistance, heat resistance and mechanical strength, and an electronic part obtained by using the composition. In particular, when used as a semiconductor sealing material in a power device or the like, it is possible to produce a sealing material with low water absorption rate, high mechanical strength and high heat resistance of the molded cured product.

The invention claimed is:

1. A thermosetting resin composition comprising (A) a polyalkenylphenol resin and (B) an aromatic polymaleimide compound, wherein the polyalkenylphenol resin (A) has in the molecule at least one each of (a1) an aromatic ring unit with an alkyl-etherified phenolic hydroxyl group and with or without a 2-alkenyl group bonded thereto, and (a2) an aromatic ring unit with a phenolic hydroxyl group and with or without a 2-alkenyl group bonded thereto, at least some of the aromatic ring units (a1) and/or (a2) having a 2-alkenyl group, each aromatic ring unit being bonded by a linking group, wherein the ratio of n to (m+n) is 15 to 50% where m is the number of aromatic ring units of (a1) and n is the number of aromatic ring units of (a2), and wherein the thermosetting resin composition comprises the polyalkenylphenol resin (A) in an amount such that the proportion of 2-alkenyl groups is 0.4 to 1.5 mol relative to 1 mol of maleimide groups in the aromatic polymaleimide compound (B) wherein the cured product of the thermosetting composition has a water absorption rate of less than or equal to 0.3%.

2. A thermosetting resin composition according to claim 1, wherein the aromatic ring unit of (a1) is a structural unit represented by formula (1) and the aromatic ring unit of (a2) is a structural unit represented by formula (2):

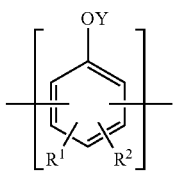
(1)

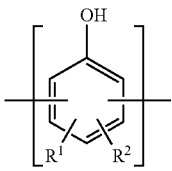

(2)

wherein, in formulas (1) and (2), each $R^1$ independently is a hydrogen atom, an alkyl group having 1 to 5 carbon atoms or an alkoxy group having 1 to 5 carbon atoms, each $R^2$ independently is a hydrogen atom, an alkyl group having 1 to 5 carbon atoms, an alkoxy group having 1 to 5 carbon atoms or a 2-alkenyl group represented by formula (3):

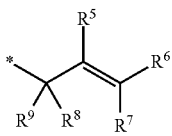

(3)

wherein, in formula (1), Y is an alkyl group having 1 to 5 carbon atoms, and in formula (3), $R^5$, $R^6$, $R^7$, $R^8$ and $R^9$ each independently are a hydrogen atom, an alkyl group having 1 to 5 carbon atoms, a cycloalkyl group having 5 to 10 carbon atoms or an aryl group having 6 to 12 carbon atoms, the symbol "*" in formula (3) representing a binding site with a carbon atom composing the aromatic ring.

3. A thermosetting resin composition according to claim 2, wherein the linking group is a divalent linking group represented by formula (4):

-Q- (4)

wherein each Q independently is an alkylene group represented by the formula $CR^3R^4$, a cycloalkylene group having 5 to 10 carbon atoms, a divalent organic group having an aromatic ring having 6 to 14 carbon atoms, a divalent organic group having an alicyclic fused ring having 7 to 10 carbon atoms, or a divalent group that is a combination thereof, and $R^3$ and $R^4$ each independently are a hydrogen atom, an alkyl group having 1 to 5 carbon atoms, an alkenyl group having 2 to 6 carbon atoms, a cycloalkyl group having 5 to 10 carbon atoms or an aryl group having 6 to 12 carbon atoms.

4. A thermosetting resin composition according to claim 3, wherein Q in formula (4) is $CH_2$.

5. A thermosetting resin composition according to claim 4, wherein the 2-alkenyl group represented by formula (3) is bonded to the carbon atom at the ortho position or the para position relative to the phenolic hydroxyl group.

6. A thermosetting resin composition according to claim 3, wherein the 2-alkenyl group represented by formula (3) is bonded to the carbon atom at the ortho position or the para position relative to the phenolic hydroxyl group.

7. A thermosetting resin composition according to claim 2, wherein the 2-alkenyl group represented by formula (3) is bonded to the carbon atom at the ortho position or the para position relative to the phenolic hydroxyl group.

8. A thermosetting resin composition according to claim 2, wherein the 2-alkenyl group represented by formula (3) is an allyl group.

9. A thermosetting resin composition according to claim 1, wherein the number-average molecular weight of the polyalkenylphenol resin (A) is 750 to 5000.

10. A thermosetting resin composition according to claim 1, wherein the aromatic polymaleimide compound (B) is an aromatic bismaleimide compound having a maleimidephenyl group.

11. A thermosetting resin composition according to claim 1, further comprising (C) a polymerization initiator.

12. A thermosetting resin composition according to claim 11, wherein the polymerization initiator (C) is an organic peroxide.

13. A thermosetting resin composition according to claim 11, wherein the thermosetting resin composition comprises 0.1 to 5 parts by mass of the polymerization initiator (C) relative to 100 parts by mass of the total amount of the polyalkenylphenol resin (A) and the aromatic polymaleimide compound (B).

14. A thermosetting resin composition according to claim 1, further comprising a filler.

15. A thermosetting resin composition according to claim 14, wherein the filler is an inorganic filler selected from the group consisting of amorphous silica, crystalline silica, alumina, boron nitride, aluminum nitride, silicon nitride, and mixtures thereof.

* * * * *